United States Patent [19]
Demuro

[11] Patent Number: 6,046,575
[45] Date of Patent: Apr. 4, 2000

[54] FAIL SAFE CIRCUIT AND BATTERY PACK USING SAME

[75] Inventor: David M. Demuro, Snellville, Ga.

[73] Assignee: Motorola, Inc., Schauburg, Ill.

[21] Appl. No.: 09/054,009

[22] Filed: Apr. 2, 1998

[51] Int. Cl.[7] .............................. H02J 7/00; H02H 3/20
[52] U.S. Cl. .............................................. 320/134; 320/164
[58] Field of Search ................................. 320/134, 135, 320/136, 162, 163, 164; 361/81, 91, 92, 90

[56] References Cited

U.S. PATENT DOCUMENTS

| | | | |
|---|---|---|---|
| 4,215,306 | 7/1980 | Mase | 144/33 |
| 4,320,333 | 3/1982 | Hase | 320/159 |
| 4,399,396 | 8/1983 | Hase | 320/158 |
| 4,563,628 | 1/1986 | Tietz et al. | 320/20 |
| 5,691,619 | 11/1997 | Vingsbo | 361/86 |

*Primary Examiner*—Peter S. Wong
*Assistant Examiner*—Gregory J. Toatley, Jr.
*Attorney, Agent, or Firm*—Felipe J. Farley

[57] ABSTRACT

A battery pack (102) comprises a lithium battery cell or cells (112), and is charged by a charger (104). In the event of a failure in the charger, an over-voltage protection circuit (120, 122) normally prevents charging of the battery cell above an over-voltage limit. In the event of a failure in both the charger and the over-voltage protection circuit, a critical voltage protection circuit (124, 126, 128) is provided to render the battery inoperative in a fail safe state. Specifically, a critical voltage control circuit (128) senses the battery voltage reaching the critical voltage level and responds by closing a current shunt switch (126), which draws current from the battery cell or cells through a fuse (124), causing the fuse to open, thus rendering the battery pack inoperative in a fail safe state.

10 Claims, 2 Drawing Sheets

FAIL SAFE CIRCUIT AND BATTERY PACK USING SAME

FIELD OF THE INVENTION

The invention relates in general to rechargeable battery packs, and more particularly to safety circuitry for use in rechargeable battery packs.

BACKGROUND OF THE INVENTION

Rechargeable battery packs are used with many different types of portable electrical and electronic devices. Examples of such devices include hand-held communications devices, such as cellular telephones, and power tools, such as cordless drills. In designing rechargeable battery packs for such devices there are usually two conflicting goals: maximizing the energy storage capacity and minimizing the weight of the battery pack. For many years a typical rechargeable battery pack comprised nickel cadmium battery cells. More recently another type of battery cell using an electro-chemical system commonly referred to as nickel metal-hydride has gained acceptance because of its increased energy capacity to weight ratio compared with nickel cadmium type battery cells. In the past couple years, a third type of battery cell, whose electro-chemical system is commonly referred to as lithium ion, has gained notoriety because it offers an energy capacity to weight ratio that is significantly superior to both nickel metal-hydride and nickel cadmium type battery cells.

However, the certain precautions must be taken when designing a battery pack based on lithium ion cells. For one, over-discharging a lithium ion battery cell can irreversibly damage the cell and significantly shorten its cycle life. Thus, nearly all manufacturers of lithium ion battery packs have incorporated a circuit in the battery pack to prevent over-discharge, typically by preventing the battery pack from sourcing electrical current once the battery voltage of the battery cell falls to an under-voltage level. This is usually done by providing an undervoltage switch in series with the battery cell(s) that opens once the battery voltage reaches the undervoltage level. Likewise, charging a lithium ion battery cell above an over-voltage level, typically about 4.2 volts DC, can shorten the cycle life of the cell. Furthermore, charging a lithium ion battery cell beyond the over-voltage level, in extreme circumstances, can result in a safety hazard as the cell may experience a thermally induced rupture. To prevent over-charging of lithium ion cells, two measures are typically implemented. First, the associated battery chargers are designed such that their output voltage is limited to prevent the battery voltage from exceeding an over-voltage level. This type of limiting can be achieved either through hardware design, software design, or both. Second, an over-voltage switch and associated control circuit are provided in the battery pack. If the battery voltage reaches a level beyond a level that an appropriately designed charger would limit, the control circuit causes the over-voltage switch to open, thus preventing any further charging of the battery cell. Both under-voltage and over-voltage circuits are well practiced in the art.

However, it is conceivable that both the battery charger and the over-voltage circuit of the battery pack may fail, resulting in the lithium ion cells being unprotected from an overcharge condition. In the unlikely event that a double failure such as this occurs, a safety hazard can exist. Therefore there is a need for a means to prevent the occurrence of an unsafe condition, even if a failure occurs in both the charger and the over-voltage circuit of the lithium ion battery pack.

DETAILED DESCRIPTION OF A PREFERRED EMBODIMENT

Figure 1:
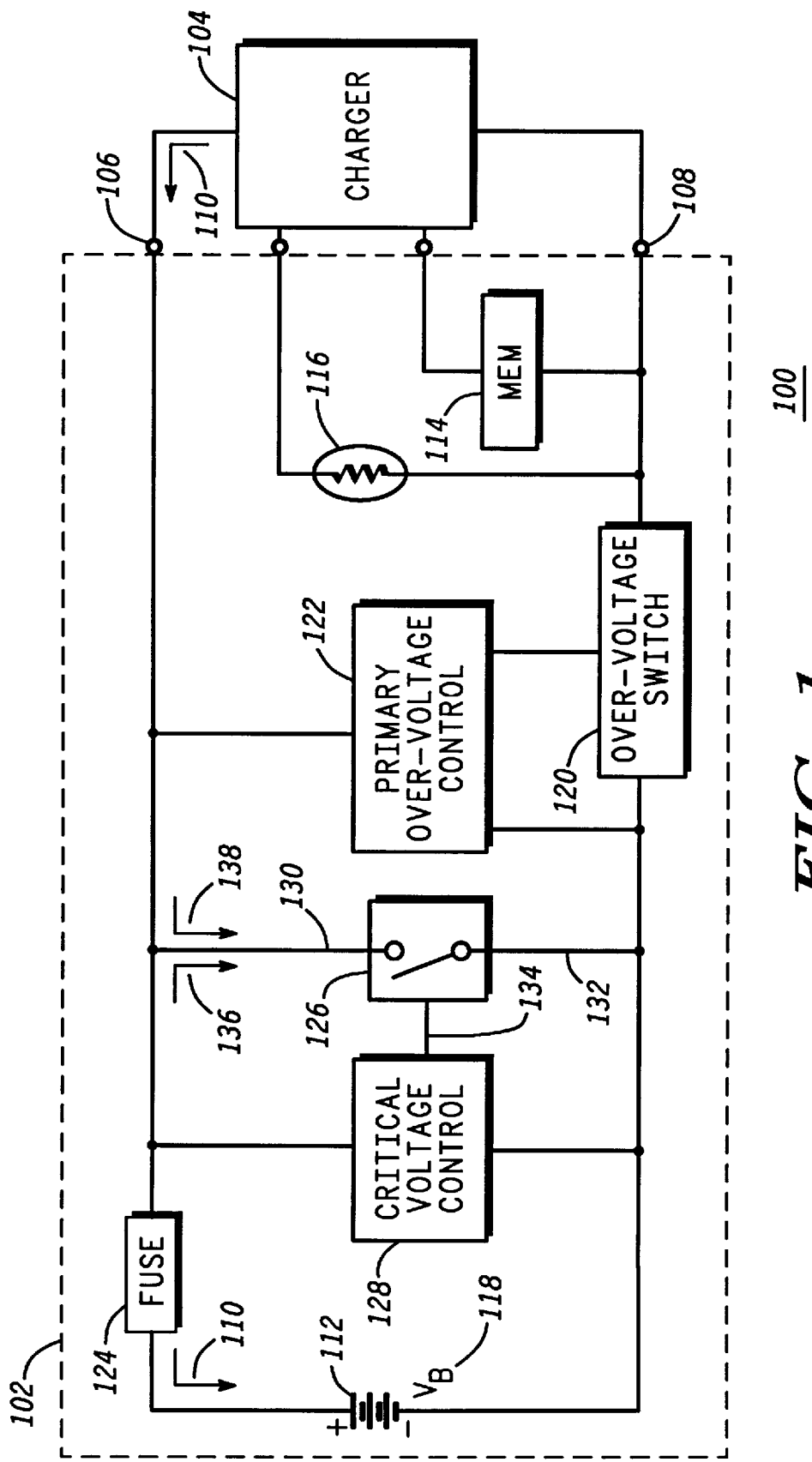
FIG. 1 shows a block diagram of a battery system comprising a fail safe circuit in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of a potential safety hazard of a lithium ion battery pack in the occurrence of a double failure condition, one failure in an associated charger and a second in the over-voltage protection circuit in the battery pack, by providing a critical voltage detection circuit. The critical voltage detection circuit, upon detecting the lithium ion battery voltage reaching a critical voltage level, actuates a switch that disables the battery pack. To render the battery pack disabled, a current sensitive element is coupled in series with the lithium ion cell or cells. If the battery voltage reaches a critical level, a current in excess of the rating of the current sensitive element is forced through the current sensitive element, causing it to fail, thereby making it impossible for any further current to pass through the battery cell or cells.

Referring now to FIG. 1, there is shown a block diagram of a battery system 100 in accordance with the invention. The battery system is comprised of a rechargeable lithium battery pack 102 and a charger 104. The charger is coupled to the battery pack by at least a positive contact 106 and a negative contact 108, and provides a charge current in the direction of arrow 110. The battery pack comprises at least one lithium battery cell 112, such as a lithium ion or a lithium polymer battery cell, for example. In general, the battery cell or cells, regardless of chemistry, are sensitive to over-voltage conditions.

In a typical charger designed to charge lithium batteries, upon coupling the battery pack to the charger, the charger performs some pre-charge routines, which may include, for example, reading a memory device 114 disposed in the battery pack, and/or reading the temperature of the battery pack using a thermistor 116, both as known in the art. The charger is designed to provide an optimum charge regime for the battery cell type, which can be indicated by information in the memory device. Typically lithium type battery cells are charged by applying a constant DC current level until the battery voltage Vb (118) reaches a preselected voltage limit. Any elements connected in series with the battery cells are selected to have a very low impedance so the voltage sensed between the positive and negative contacts is substantially the same as Vb. Once the voltage limit is reached, the charger controls the charge current level such that Vb is held substantially constant.

However, it is possible, as the result of abuse, for example, that the charger does not perform as intended, and allows the battery voltage to exceed the preferred voltage limit. In another instance, it may occur that the battery is coupled to a charger not intended to charge lithium batteries, or is not designed in accordance with the recommended specifications of the battery pack manufacturer. In such cases, the battery voltage can exceed the preferred voltage, and potentially damage the battery cell. To prevent significant damage from occurring, as is known in the art, a primary over-voltage circuit, comprised of over-voltage switch 120 and primary over-voltage control circuit 122, is provided. The over-voltage switch is coupled in series with the battery cells, and is normally closed, allowing the flow of charging current through the battery cells. However, the over-voltage control circuit is responsive to the battery voltage, and upon the battery voltage reaching a preselected over-voltage level, typically about 4.2 volts per cell, the over-voltage control circuit causes the over-voltage switch to open, thus preventing any further charging of the battery cell or cells. Typically, as is well practiced in the art, the over-voltage switch is an N-channel enhancement mode metallic oxide semiconductor filed effect transistor (MOSFET). Furthermore, as more and more electronic device are operated at low voltage levels, there may be only a single cell, and the over-voltage MOSFET switch must be operable at such voltage levels. Numerous integrated circuit chips are available that can serve the function of the over-voltage control circuit as described, as well as other functions. Thus, the primary over-voltage circuit should prevent charging once the battery voltage reaches the over-voltage limit.

As mentioned hereinabove, it is conceivable that both the charger and the primary over-voltage protection circuit fail to limit the battery voltage to acceptable levels. To prevent the occurrence of a potentially unsafe condition, a critical voltage protection circuit is provided that irreversibly opens the charging path so that the battery pack is physically incapable of conducting any further charge current. This results in a fail safe condition.

The critical voltage protection circuit is comprised of three elements: a fuse 124, a current shunt switch 126, and a critical voltage control circuit 128. The fuse is coupled in series with the battery cell or cells such that whatever current passes through the battery cell or cells must also pass through the fuse. As such, the current fuse has a current rating selected high enough to permit the flow of normal charge current levels. The critical voltage control circuit 128, like the over-voltage control circuit, is responsive to the battery voltage. The current shunt switch is normally open, and has conductive terminals 130, 132 connected across the series combination of the fuse and the battery cell or cells. The current shunt switch also has control terminal 134 connected to the critical voltage control circuit. When the battery voltage reaches the critical voltage level, it can be assumed that a failure has occurred in both the charger and the primary over-voltage protection circuit. In the preferred embodiment the critical voltage level is about 4.5 volts (DC) per cell, or higher. When this level of voltage is detected, the critical voltage control circuit asserts a signal on the control terminal of the current shunt switch, causing the current shunt switch to close, changing from a high resistance state to a very low resistance state.

Figure 2:
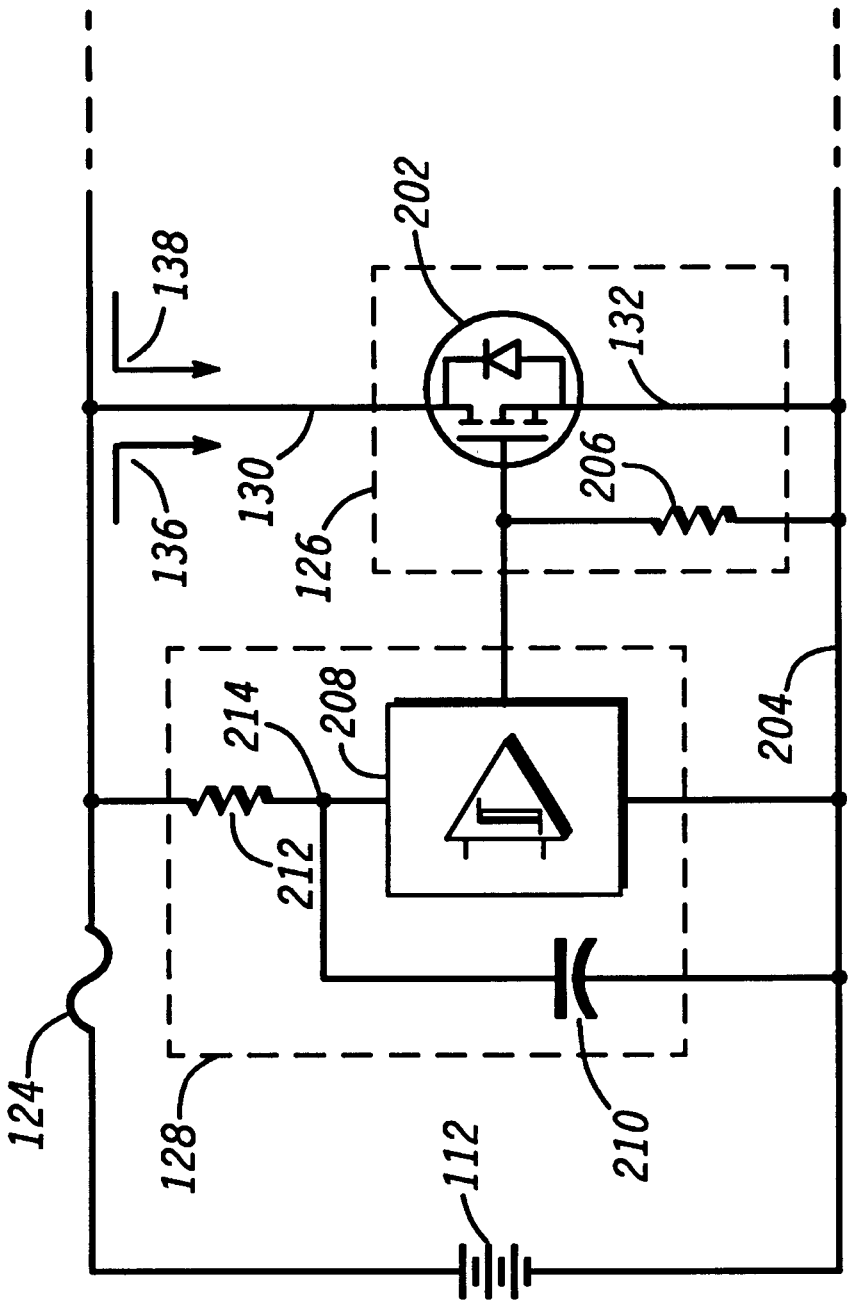
FIG. 2 shows a more detailed circuit schematic diagram of a fail safe circuit in a battery pack, in accordance with the invention.

Referring now to FIG. 2, there is shown therein a more detailed circuit schematic diagram 200 of a fail safe circuit in a battery pack, in accordance with the invention. In the preferred embodiment the current shunt switch, as with the over-voltage switch, is a MOSFET 202. The control terminal 134 is the gate of the MOSFET. Normally the voltage on the gate is substantially the same as that of the reference line 204, to which the conductive terminal 132 is connected. In the preferred embodiment, the conductive terminal 132 is the source terminal of the MOSFET, thus, normally the gate and source are at substantially the same voltage and the MOSFET is in a high resistance state between the conductive terminals 130, 132. To ensure that the gate voltage is low during normal operation, a pull down resistor 206 is connected between the gate and the reference line. The MOSFET must be selected such that it can conduct a high level of current once it is switched on (closed). In FIG. 1 there is shown two arrows 136, 138. Arrow 138 represents the charge current being sourced by the charger, and arrow 136 represents current drawn from the battery cell or cells. The conductivity of the MOSFET must be such that when switched on all of the current from the charger is conducted through the MOSFET, and a current level in excess of the current rating of the fuse 124 is drawn from the battery cell or cells, causing the fuse to open electrically. Thus, the battery pack is rendered inoperative, and since current cannot be passed through the battery cell or cells from the charger after the fuse opens, the battery pack is in a fail safe state. As the current rating of the fuse must be greater than normal charge current levels to permit charging, the MOSFET must be able to conduct at least slightly more than twice the maximum permitted charge current level.

When the MOSFET 202 closes and becomes conductive, the battery voltage will drop significantly. To maintain the desired operation of the critical voltage protection circuit, the critical voltage control circuit must be designed so that it continues to assert a voltage output on the gate of the MOSFET 202 to hold the MOSFET in the conductive state sufficiently long enough to ensure that the fuse 124 opens. In the preferred embodiment the critical voltage control circuit is comprised of a comparator circuit 208, and a holding circuit comprised of a holding capacitor 210 and a holding resistor 212. The RC time constant formed by the holding resistor and the holding capacitor is such that the voltage at the holding node 214 changes substantially as fast as the battery voltage. Furthermore, it is important that the comparator circuit have very little current draw, such as is the case if CMOS technology is used in the comparator circuit.

The comparator circuit senses directly the holding voltage, which, during charging, is substantially equal to the battery voltage. It compares the holding voltage to a reference level provided in a conventional manner. When the battery voltage reaches the critical voltage limit, the comparator circuit output transitions from a low to a high level. The high level is substantially equal to the holding voltage. As the battery voltage will drop quickly once the MOSFET 202 is turned on, the RC time constant of the holding capacitor and the holding resistor must be such that the holding voltage remains high long enough for the fuse to open. Furthermore, it is preferred that the comparator circuit be designed to have some hysteresis so that the output will remain high even as the holding voltage drops somewhat from the quick and large drop experienced in the battery voltage. Thus, the battery pack, upon the battery voltage reaching a critical voltage level, can be rendered inoperative in a fail safe mode.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A fail safe circuit for a battery pack having at least one battery cell for providing a battery voltage, the fail safe circuit comprising:

a fuse electrically coupled in series with the at least one battery cell and having a current rating;

a current shunt switch coupled in across the fuse and the at least one battery cell for shunting current from the at least one battery cell through the fuse; and a critical voltage control circuit operably coupled to the current shunt switch for controlling a switch state of the current shunt switch;

wherein the critical voltage control circuit places the current shunt switch in an open switch state while the battery voltage is below a critical voltage level and places the current shunt switch in a closed state upon the battery voltage reaching the critical voltage level; and wherein upon being placed in the closed switch state, the current shunt switch conducts current in excess of the current rating of the fuse, thereby causing the fuse to open.

2. A fail safe circuit as defined in claim 1, wherein the current shunt switch is at least one MOSFET.

3. A fail safe circuit as defined in claim 1, wherein the at least one battery cell is a lithium ion battery cell, the critical voltage level 4.5 volts DC.

4. A fail safe circuit as defined in claim 1, wherein the battery pack is chargeable by a battery charger having a maximum current output level, the current shunt switch conducts current in excess of the sum of the current rating of the fuse and the maximum current output level of the battery charger.

5. A fail safe circuit as defined in claim 1, wherein the critical voltage control circuit comprises a voltage holding circuit.

6. A battery pack, comprising:

at least one lithium battery cell for providing a battery voltage;

a primary over-voltage protection circuit having an over-voltage switch connected in series with the at least one lithium battery cell;

a fuse electrically coupled in series with the at least one battery cell and having a current rating;

a current shunt switch coupled in across the fuse and the at least one battery cell for shunting current from the at least one battery cell through the fuse; and a critical voltage control circuit operably coupled to the current shunt switch for controlling a switch state of the current shunt switch;

wherein the critical voltage control circuit places the current shunt switch in an open switch state while the battery voltage is below a critical voltage level and places the current shunt switch in a closed state upon the battery voltage reaching the critical voltage level; and wherein upon being placed in the closed switch state, the current shunt switch conducts current in excess of the current rating of the fuse, thereby causing the fuse to open.

7. A fail safe circuit as defined in claim 6, wherein the current shunt switch is at least one MOSFET.

8. A fail safe circuit as defined in claim 6, wherein the at least one battery cell is a lithium ion battery cell, the critical voltage level 4.5 volts DC.

9. A fail safe circuit as defined in claim 6, wherein the battery pack is chargeable by a battery charger having a maximum current output level, the current shunt switch conducts current in excess of the sum of the current rating of the fuse and the maximum current output level of the battery charger.

10. A fail safe circuit as defined in claim 6, wherein the critical voltage control circuit comprises a voltage holding circuit.

* * * * *